(12) United States Patent
Miyazaki et al.

(10) Patent No.: US 9,401,576 B2
(45) Date of Patent: Jul. 26, 2016

(54) APPARATUS AND METHOD FOR MANUFACTURING A STACKED ELECTRODE

(71) Applicants: Tsukasa Miyazaki, Ueda (JP); Seiji Yamaura, Ueda (JP)

(72) Inventors: Tsukasa Miyazaki, Ueda (JP); Seiji Yamaura, Ueda (JP)

(73) Assignee: NAGANO AUTOMATION CO., LTD., Ueda-Shi, Nagano (JP)

(*) Notice: Subject to any disclaimer, the term of this patent is extended or adjusted under 35 U.S.C. 154(b) by 261 days.

(21) Appl. No.: 14/114,978

(22) PCT Filed: Feb. 28, 2013

(86) PCT No.: PCT/JP2013/001221
§ 371 (c)(1),
(2) Date: Oct. 31, 2013

(87) PCT Pub. No.: WO2013/128930
PCT Pub. Date: Sep. 6, 2013

(65) Prior Publication Data
US 2014/0059855 A1 Mar. 6, 2014

(30) Foreign Application Priority Data
Feb. 28, 2012 (JP) ................. 2012-041824

(51) Int. Cl.
*H01R 43/16* (2006.01)
*H01M 10/04* (2006.01)
(Continued)

(52) U.S. Cl.
CPC ........... *H01R 43/16* (2013.01); *H01M 10/0404* (2013.01); *H01M 10/0459* (2013.01); *H01M10/0525* (2013.01); *H01M 10/0583* (2013.01); *Y10T 29/49204* (2015.01); *Y10T 29/53204* (2015.01)

(58) Field of Classification Search
CPC ......... H01M 10/045; H01M 10/0459; H01M 10/0468; H01M 10/0481; H01M 10/049; H01M 10/0585; Y10T 29/417; Y10T 29/435; Y10T 29/49108; Y10T 29/53135; Y10T 29/53204
USPC ........ 29/592.1, 746, 831, 832, 837, 842, 852, 29/854, 885
See application file for complete search history.

(56) References Cited

U.S. PATENT DOCUMENTS

| | | | | |
|---|---|---|---|---|
| 3,350,239 A | * | 10/1967 | Stanimirovitch | ....... H01M 2/18 29/623.3 |
| 4,999,263 A | * | 3/1991 | Kabata | ................. H01B 1/128 29/623.1 |

(Continued)

FOREIGN PATENT DOCUMENTS

| | | |
|---|---|---|
| JP | 61-198575 A | 9/1986 |
| JP | 63-64269 A | 3/1988 |

(Continued)

OTHER PUBLICATIONS

International Search Report (PCT/ISA/210) mailed on Apr. 9, 2013, by the Japanese Patent Office as the International Searching Authority for International Application No. PCT/JP2013/001221.

(Continued)

*Primary Examiner* — Paul D Kim
(74) *Attorney, Agent, or Firm* — Buchanan Ingersoll & Rooney PC (57) ABSTRACT

A stacking apparatus according to the present invention manufacturing a stacked electrode in which cathode sheets and anode sheets are stacked with a separator in between includes a first unit that folds a continuous separator sheet onto a first region and a second unit that alternately supplies an anode sheet and a cathode sheet to the first region in synchronization with the first unit folding the continuous separator sheet. The first unit includes a first wall surface and a second wall surface whose lengths are substantially equal to the folded length and fold the continuous separator onto the first region in a state where the continuous separator sheet is alternately vacuum chucked.

11 Claims, 4 Drawing Sheets

(51) Int. Cl.
*H01M 10/0525* (2010.01)
*H01M 10/0583* (2010.01)

(56) References Cited

U.S. PATENT DOCUMENTS

2008/0305398 A1* 12/2008 Komiya ................ H01M 6/005
429/246
2014/0020239 A1* 1/2014 Yuhara .............. H01M 10/0404
29/623.1

FOREIGN PATENT DOCUMENTS

| JP | 1-128368 A | 5/1989 |
|---|---|---|
| JP | 2-239569 A | 9/1990 |
| JP | H03-230479 A | 10/1991 |
| JP | 2002-329530 A | 11/2002 |
| JP | 2004-186298 A | 7/2004 |
| KR | 10-2011-0001295 A | 1/2011 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Sep. 12, 2014, by the International Bureau of WIPO in corresponding International Application No. PCT/JP2013/0001221. (7 pages).

The extended European Search Report issued on Mar. 19, 2015 by the European Patent Office in corresponding European Patent Application No. 13754171.0-1359. (8 pages).

* cited by examiner

APPARATUS AND METHOD FOR MANUFACTURING A STACKED ELECTRODE

TECHNICAL FIELD

The present invention relates to an apparatus and method for manufacturing a stacked electrode where anode sheets and cathode sheets are stacked with a separator in between.

BACKGROUND ART

Japanese Laid-Open Patent Publication No. 2002-329530 discloses a sheet-type battery with the objects of both miniaturization of a battery and increased capacitance through effective use of a separator or solid electrolyte layer and effective use of the internal space of a battery. Such sheet-type battery is characterized by having a plurality of anode sheets and a plurality of cathode sheets stacked so as to be alternately disposed with a separator in between and the separator being formed of a continuous sheet that is folded into a zigzag so as to be threaded between adjacent anode sheets and cathode sheets.

DISCLOSURE OF THE INVENTION

The electrode assembly or stacked electrode used in a lithium battery (cell) or the like is manufactured by stacking (piling up, stacking) a plurality of anode sheets (anode plates) and cathode sheets (cathode plates) with a separator (separator sheet) in between. For this reason, there is demand for an apparatus capable of stacking a separator, anode sheets, and cathode sheets that is precise and has a simple construction.

One aspect of the present invention is an apparatus that manufactures a stacked electrode where anode sheets and cathode sheets are stacked with a separator in between. The apparatus includes a first unit folding a continuous separator (continuous separator sheet) onto a first region and a second unit that alternately supplies an anode sheet and a cathode sheet to the first region in synchronization with folding of the continuous separator by the first unit. The first unit includes a first wall surface and a second wall surface whose lengths are substantially equal to a folded length and fold over the continuous separator onto the first region in a state where the continuous separator is held by suction (vacuum chucked) alternately by the first wall surface and the second wall surface.

By supporting the continuous separator sheet (hereinafter simply "separator") alternately on the first and second wall surfaces by vacuum or suction, it is possible to maintain tension in the vicinity of the first region when the continuous separator is folded and piled up. This means that it is possible to suppress fluctuations in tension when the separator is folded up on the first region. Accordingly, it is possible to precisely manufacture a layered stack (stacked electrode, electrode stack) where a separator, anode sheets, and cathode sheets are stacked using a continuous separator.

It is desirable for the first wall surface and the second wall surface to be disposed on both sides of the first region and to be alternately lowered onto and reversed from the first region. By carrying out a simple operation of lowering a wall surface, it is possible to alternately place such wall surfaces on the first region. It is also preferable for the first wall surface and the second wall surface to be disposed on both sides of the first region and to be alternately lowered (rotated downward) onto and erected (rotated upward) from the first region. It is possible to make the movable range of the wall surface narrower and to also make the range of movement of the separator narrower. This means that it is easy to provide a compact apparatus with a short Takt time.

The first unit should preferably include: a first subunit that takes hold of (catch) the continuous separator sheet on the first wall surface when the second wall surface has been lowered or rotated, lowers the first wall surface to the first region in a state where the continuous separator is held, and reverses the first wall surface in a state where the continuous separator has been released; and a second subunit that catch the continuous separator on the second wall surface when the first wall surface has been lowered or swung, lowers the second wall surface to the first region in a state where the continuous separator is held by suction (vacuum), and reverses the second wall surface in a state where the continuous separator has been released.

It is effective for the first wall surface to include a leading end (front end) that guides the continuous separator to a base end of the second wall surface when the first wall surface has been lowered or swung downward and for the second wall surface to include a leading end that guides the continuous separator to a base end of the first wall surface when the second wall surface has been lowered or swung. Lowering the wall surface can also serve as passing over the continuous separator to another wall surface and has the separator supported or held by suction (vacuum chucking). It is desirable for the first unit to further include a third wall surface that presses the continuous separator onto the second wall surface when the first wall surface has been lowered and a fourth wall surface that presses the continuous separator onto the first wall surface when the second wall surface has been lowered. It is possible to have the continuous separator sheet alternately held by suction more reliably from the first wall surface to the second wall surface and from the second wall surface to the first wall surface.

It is effective for the apparatus to further include a supplying unit that supplies the continuous separator sheet to the first wall surface and the second wall surface in a state where the continuous separator sheet is under tension. Since the separator is held or supported by a wall surface in the vicinity of the first region, it is possible during folding to prevent the occurrence of warping and wrinkles in the separator with low tension. This means that it is possible to reduce the tension applied to the continuous sheet of the separator and to manufacture a high-quality layered stack.

It is also desirable for the apparatus to further include a position adjusting unit that causes the layered stack stacked on the first region to retract (move backward) from the first wall surface and the second wall surface. When manufacturing a multilayer stack, it is possible to keep the relationship between the stacking position and the wall surfaces constant. The position adjusting unit may raise the position of the wall surfaces or may retract (lower) the position of layered stack.

Another aspect of the present invention is a method including manufacturing a stacked electrode where anode sheets and cathode sheets are stacked with a separator in between, typically a method of manufacturing a layered stack (electrode stack, stacked electrode) or a method of manufacturing a battery (cell) including a stacked electrode. The method includes the following steps.

1. Folding a continuous film of separator onto a first region by placing a first wall surface and a second wall surface, whose lengths are substantially equal to a folded length, on the first region in a state where the continuous separator is alternately held.

2. Stacking an anode sheet and a cathode sheet by alternately supplying the anode sheet and the cathode sheet to the first region in synchronization with the folding the continuous separator.

It is desirable for the folding to include alternately lowering (swinging or rotating downward) and reversing the first wall surface and the second wall surface, which are disposed on both sides of the first region, onto and from the first region to fold the continuous separator sheet supplied to the first region from above onto the first region. In addition, it is desirable for the folding to include: lowering the first wall surface onto the first region in a state where the continuous separator is held by suction (vacuum) and reversing the first wall surface in a state where the continuous separator has been released; and the second wall surface taking hold of the continuous separator when the first wall surface has been lowered. In the same way, it is desirable for the folding to include: lowering the second wall surface onto the first region in a state where the continuous separator is held and reversing the second wall surface in a state where the continuous separator has been released; and the first wall surface catching the continuous separator when the second wall surface has been lowered.

Yet another aspect of the present invention is a control method for an apparatus including a first unit and a second unit. The apparatus includes a first unit that alternately lowers a first wall surface and a second wall surface whose lengths are substantially equal to a folded length onto a first region to fold a continuous separator onto the first region and a second unit that alternately supplies an anode sheet and a cathode sheet to the first region in synchronization with folding of the continuous separator. The control method includes the following steps and is provided having been recorded in a computer including computer resources such as a CPU and a memory or on an appropriate medium (CD-ROM or the like) as a program (program product) that causes a computer to operate.

Lowering (rotating downward) the first wall surface onto the first region in a state where the continuous separator is held and erecting (rotating upward) the first wall surface in a state where the continuous separator has been released.

Lowering the second wall surface onto the first region in a state where the continuous separator is held when the first wall has been erected and erecting the second wall surface in a state where the continuous separator has been released.

BRIEF DESCRIPTION OF THE DRAWINGS

FIGS. 5(a) to (e) show a procedure for assembling a cell using the stacking unit.

DETAIL DESCRIPTION

Figure 1:
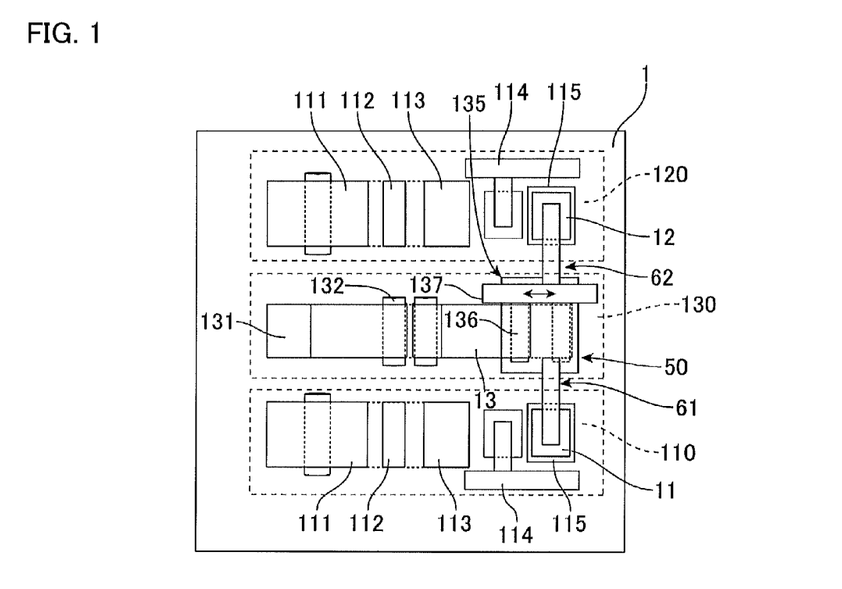
FIG. 1 is a diagram showing the overall layout of a stacking apparatus.

FIG. 1 shows a stacking apparatus that manufactures a stacked electrode (or cell) by stacking anode sheets, cathode sheets, and a separator. This stacking apparatus 1 includes a first supply line 110 that supplies anode sheets 11, a second supply line 120 that supplies cathode sheets 12, a third supply line 130 that supplies a separator 13, a stacking unit 50 that produces a cell (layered stack) 10 by stacking the anode sheets 11 and the cathode sheets 12 with the separator 13 in between, a first conveying unit 61 that conveys an anode sheet 11 from the first supply line 110 to the stacking unit 50 and a second conveying unit 62 that conveys a cathode sheet 12 from the second supply line 120 to the stacking unit 50.

Figure 2:
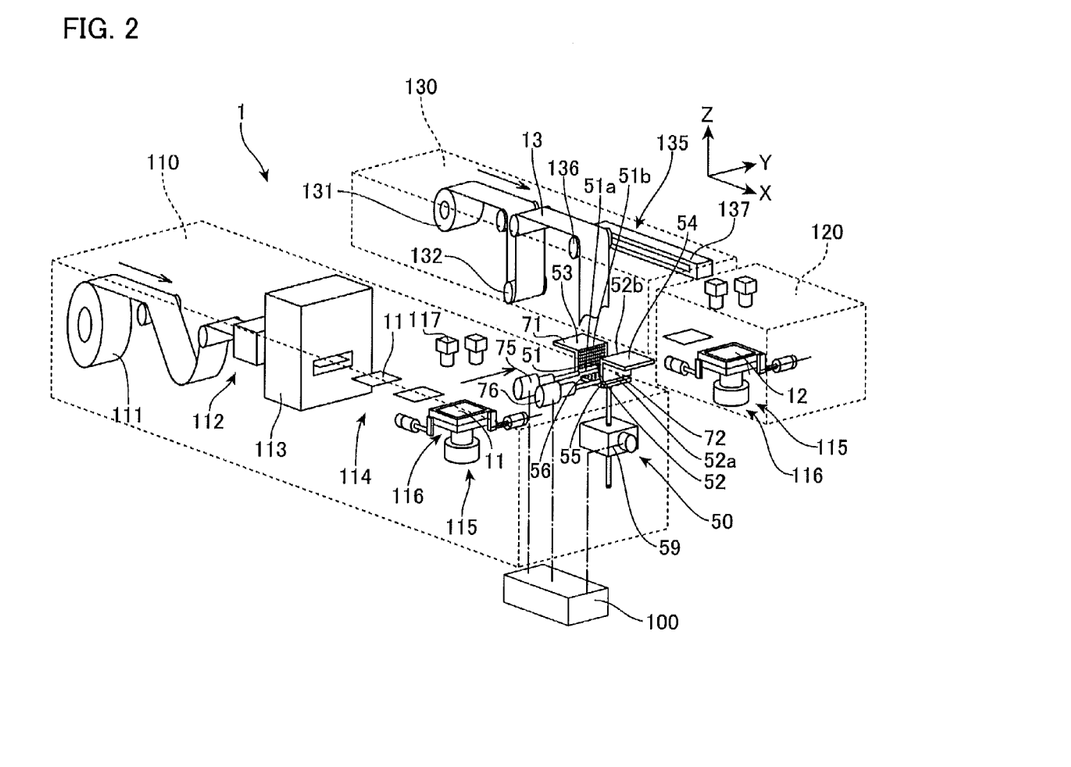
FIG. 2 is a diagram showing the configuration of a stacking apparatus.

FIG. 2 shows the configuration of the stacking apparatus 1 in more detail. The first supply line 110 and the second supply line 120 have a common configuration and although only the final alignment unit of the second supply line 120 is shown in FIG. 2, the remaining configuration will be described for the first supply line 110. The first supply line 110 that supplies the anode sheets (electrode sheets) 11 includes a roll 111 where a continuous anode sheet 11 has been wound into a cylinder, a sizing feeder 112 that pulls out a fixed length of sheet from the roll 111, a cutter 113 that cuts the sheet into fixed lengths, an alignment unit 115 that adjusts the orientation of an electrode sheet 11 that has been cut, and a conveying unit 114 that conveys the electrode sheet 11 from the cutter 113 to the alignment unit 115.

The alignment unit 115 includes a camera 117 that detects the posture (orientation) of the electrode sheet 11 and an XYθ table 116 that controls the posture of the electrode sheet 11. The electrode sheet 11 whose posture has been adjusted by the XYθ table 116 to become a predetermined orientation is conveyed by the first conveying unit 61 (not shown in FIG. 2) to the stacking unit 50. This also applies to the cathode sheets 12 so that a cathode sheet 12 that has been aligned by the XYθ table 116 of the second supply line 120 is conveyed by the second conveying unit 62 (not shown in FIG. 2) to the stacking unit 50.

The third supply line 130 that supplies the separator 13 includes a roll 131 where a continuous separator 13 has been wound into a cylinder, a tension roller 132 that applies a fixed amount of tension to the continuous separator, and a third conveying unit 135 that conveys the continuous separator 13 to the stacking unit 50. The third conveying unit 135 includes a supply roller 136 that changes the supplying direction of the continuous separator 13 and a slider 137 that changes the position of the supply roller 136 in the direction (length direction, X direction) in which the continuous separator 13 is supplied continuously.

The stacking unit (folding unit, electrode assembling unit, first unit) 50 includes a stacking stage 55 that supports a layered stack, a first wing (first wall) 71 and a second wing (second wall) 72 that are disposed on both sides of a stacking region (first region) 56 of the stacking stage 55 (i.e., on opposing or facing sides with the stacking region 56 in between), a first driving motor 75 that rotationally drives the first wing 71 in the X direction, a second driving motor 76 that rotationally drives the second wing 72 in the X direction, and a position adjusting unit 59 that controls the position in the Z direction of the stacking stage 55. The stacking apparatus 1 further includes a control unit 100 that controls such motors and the like. The first wing 71 has a first wall surface 51 that faces the stacking region (first region) 56 of the stacking stage 55 and is lowered (rotated or swung downward) onto and reversed from the stacking region 56. The second wing 72 has a second wall surface 52 that faces the stacking region 56 and is lowered onto and reversed from the stacking region 56.

The first wing 71 is an inverted L-shaped member (unit, flap) including the first wall surface 51 that moves (rotates) about a base end 51a with respect to the stacking region 56 of the stacking stage 55 to a standing state (erect state) and a lowered state (rotated downward, prostrated state, laid flat state), and a third wall surface 53 that perpendicularly extends from a leading end (front end) 51b of the first wall surface 51 on the opposite side to the stacking region 56. The second wing 72 is an inverted L-shaped member (unit, flap) including a second wall surface 52 that moves (rotates) about a base end 52a with respect to the stacking region 56 of the stacking stage 55 to the standing state and the lowered state, and a fourth wall surface 54 that perpendicularly extends from a leading end 52b of the second wall surface 52 on the opposite side to the stacking region 56.

The lengths (lengths in the vertical direction) of the first wall surface 51 and the second wall surface 52 are equal to the length of the stacking region (first region) 56 where the continuous separator (the continuous sheet of the separator) 13 is folded and piled up (folded over) and the lengths (lengths in the horizontal direction) of the third wall surface 53 and the fourth wall surface 54 are shorter than the lengths of the first wall surface 51 and the second wall surface 52 at around ⅓ to ⅔ of such lengths. It is sufficient for the first wing 71 and the second wing 72 to include such wall surfaces 71 to 74 and the first wing 71 and the second wing 72 are not limited to L shapes and may be cubes, rectangular solids, or triangular cylinders.

The first wing 71 and the second wing 72 are disposed facing both sides in the X direction of the stacking region 56 of the stacking stage 55, that is, both sides of the direction in which the continuous separator 13 is extended, that is the direction in which the separator 13 is continuously supplied.

Figure 3:
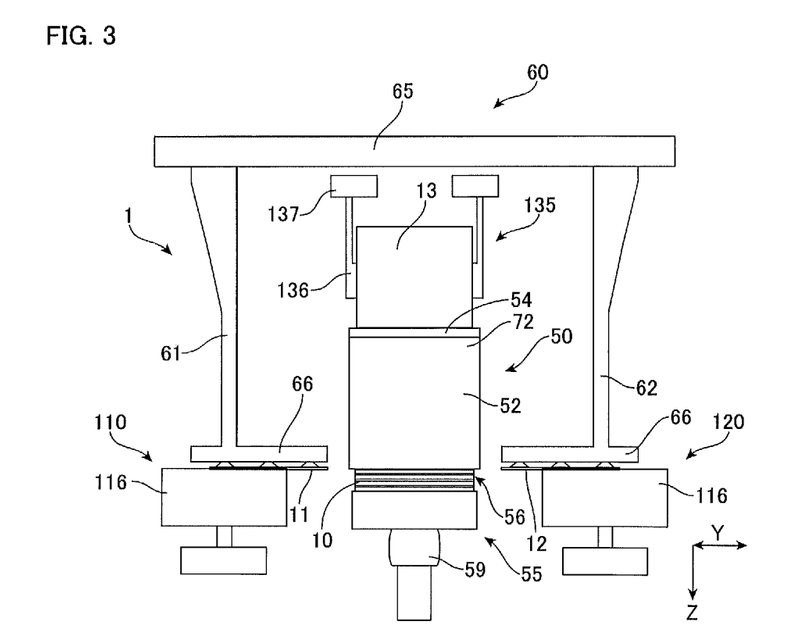
FIG. 3 is a diagram showing a stacking unit from the X direction.
Figure 4:
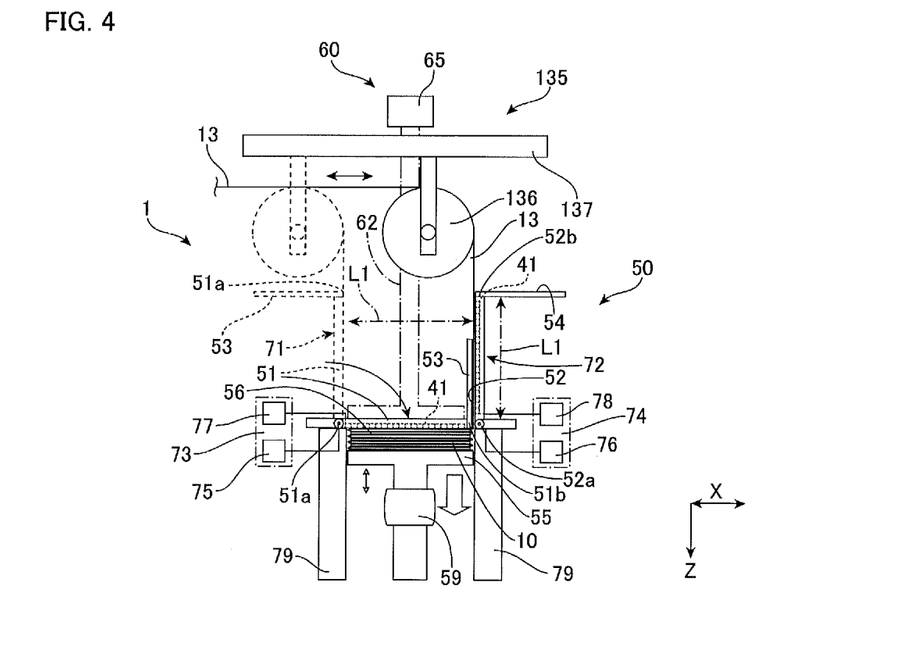
FIG. 4 is a diagram showing a stacking unit from the Y direction.

FIG. 3 shows a state where the stacking unit 50 is viewed from the X direction. FIG. 4 shows a state where the stacking unit 50 is viewed from the Y direction. The stacking apparatus 1 includes a sheet conveying unit (second unit) 60 that supplies the anode sheets 11 and the cathode sheets 12 to the stacking unit (first unit) 50 from the Y direction (a direction perpendicular to the direction in which the separator 13 is continuously supplied). The sheet conveying unit 60 alternately supplies an anode sheet 11 and a cathode sheet 12 to the stacking region (first region) 56 in synchronization with the stacking unit 50 that folds the continuous separator 13.

The sheet conveying unit (second unit) 60 includes a rail 65 that extends in the Y direction and a first conveying unit 61 and a second conveying unit 62 that move the rail 65 in the Y direction. The first conveying unit 61 conveys an anode sheet 11 from the XYθ table 116 of the first supply line 110 to the stacking region 56 on the stacking stage 55. The second conveying unit 62 conveys a cathode sheet 12 from the XYθ table 116 of the second supply line 120 to the stacking region 56 on the stacking stage 55. The conveying units 61 and 62 respectively include a suction head (vacuum chucking head) that holds the sheets 11 and 12 by vacuum chucking.

One example of the anode sheets (anode plates) 11 of the stacked electrode 10 of a lithium cell is produced by applying an anode activator, which has been produced by mixing a conductive material such as carbon black and an adhesive such as an aqueous dispersion of polytetrafluoroethylene into a metal oxide (such as lithium nickelate) that is the anode active material, onto both surfaces of metal foil, such as aluminum foil, drying, rolling, and then cutting to a predetermined size. One example of the cathode sheets (cathode plates) 12 is produced by applying a cathode active material (such as amorphous carbon) that occludes and releases lithium ions of the anode active material on both surfaces of metal foil such as nickel foil or copper foil, drying, rolling, and cutting to a predetermined size. The anode sheets 11 and the cathode sheets 12 are not limited to use in a lithium cell and may be another type of cell or may be an electrode structure of a fuel cell.

The stacking unit (first unit) 50 shown in FIG. 4 includes the first wall surface 51 and the second wall surface 52 that are wall surfaces with substantially the same length as the folded length L1 and are placed on the stacking region (first region) 56 in a state where the continuous separator sheet 13 is alternately held with suction (vacuum chucked) by such wall surfaces. It is desirable for the width of the first and second wall surfaces 51 and 52 to be the same as the width of the separator 13 or slightly wider. Although the width of the first and second wall surfaces 51 and 52 may be narrower than the width of the separator 13, supporting the entire width of the separator 13 makes it easier to maintain high precision for the folded part during folding.

The separator 13 prevents short circuits between the anode sheets (anode plates, anode layers) 11 and the cathode sheets (cathode plates, cathode layers) 12 described above and may also function so as to hold an electrolyte. As one example, the separator 13 is a microporous film which is composed for example of a polyolefin such as polyethylene (PE) and polypropylene (PP) and has a function whereby when an overcurrent flows, the pores in the film are closed by the resulting heat so as to interrupt the current. The separator 13 is not limited to a single layer film or sheet of polyolefin or the like, and it is also possible to use a three-layer structure where a polyethylene layer is sandwiched by polypropylene layers and a stacked structure of a microporous polyolefin film and an organic non-woven fabric. Note that in the present specification, the expression "separator" refers to a film-type or sheet-type material that is sandwiched between electrodes.

The first wing 71 of the stacking unit 50 as a whole is an inverted L-shaped unit that includes the first wall surface 51 and the third wall surface 53 that extends in a direction perpendicular to the first wall surface 51, and the first wall surface 51 is provided with a plurality of suction holes 41 for holding by vacuum (pulling by suction) the separator 13. The second wing 72 as a whole is an inverted L-shaped unit that includes the second wall surface 52 and the fourth wall surface 54 that extends in a direction perpendicular to the second wall surface 52, and the second wall surface 52 is provided with a plurality of suction holes 41 for holding by vacuum (pulling by suction) the separator 13.

The stacking unit 50 includes a first subunit 73 that controls the first wing 71 and a second subunit 74 that controls the second wing 72. The first subunit 73 includes a motor 75 that drives the first wing 71 to revolve about the base end 51a to a state where the first wing 71 is lowered (fallen over, prostrated, laid flat) onto the stacking region 56 and an reversed state (a state where the first wing 71 is erected in the perpendicular direction) and a suction control unit 77 that holds the separator 13 by vacuum on the first wall surface 51 by placing the plurality of suction holes 41 provided in the first wall surface 51 under negative pressure and releases the separator 13 by breaking the negative pressure. More specifically, the first subunit 73 takes hold of the continuous separator 13 using the first wall surface 51 when the second wall surface 52 has been lowered, the first wall surface 51 is then lowered onto the stacking region (first region) 56 in a state where the continuous separator 13 is held by suction, and the first wall surface 51 is reversed in a state where the continuous separator 13 has been released.

The second subunit 74 includes a motor 76 that drives the second wing 72 to revolve about the base end 52a to a state where the second wing 72 is lowered onto the stacking region 56 and a reversed state (a state where the second wing 72 is erected) and a suction control unit 78 that holds the separator 13 by vacuum chucking on the second wall surface 52 by placing the plurality of suction holes 41 provided in the second wall surface 52 under negative pressure and releases the separator 13 by breaking the negative pressure. The second subunit 74 catches by suction the continuous separator 13 using the second wall surface 52 when the first wall surface 51 has been lowered, the second wall surface 52 is then lowered onto the stacking region (first region) 56 in a state where the continuous separator 13 is vacuum chucked, and the second wall surface 52 is reversed in a state where the continuous separator 13 has been released.

The base ends 51a and 52a of the wall surfaces 51 and 52 are respectively disposed so that to match the ends face each other in the X direction of the stacking region 56 that have the same size as the cross section (when viewed from the front) of the layered stack (stacked electrode) 10. The length (height) L1 of the first wall surface 51 is the same as the length (width) L1 of the stacking region 56, that is, the length (width) of the stacked electrode 10, and when the first wing 71 revolves in the clockwise direction, the first wall surface 51 is placed on the stacking region 56 and the separator 13 that was vacuum chucked on the first wall surface 51 is folded over so as to become placed onto the stacking region 56, thereby manufacturing the stacked electrode 10 with the length (width) L1.

At such time, the upper end (leading end) 51b of the first wall surface 51 reaches the extreme vicinity of the base end 52a of the facing second wall surface 52 and the third wall surface 53 faces (opposes) the second wall surface 52 at an extremely short distance. Accordingly, when the first wing 71 is lowered toward the stacking region 56, in addition to the continuous separator 13 being folded over onto the stacking region 56, the continuous separator 13 is guided by the upper end 51b of the first wall surface 51 onto the second wall surface 52 of the second wing 72 and becomes sandwiched between the third wall surface 53 of the first wing 71 and the second wall surface 52 of the second wing 72. In this state, once the suction (vacuum chucking) by the first wall surface 51 is released and the continuous separator 13 has been sucked by the second wall surface 52, second wall surface 52 catches the separator sheet 13 from the first wall surface 51 without the continuous separator 13 becoming loose.

The movement of the continuous separator 13 is the same when it folded over and placed on the stacking region 56 by the second wing 72. When the separator sheet 13 is folded over onto the stacking region 56, the continuous separator 13 is held by suction alternately by the first wall surface 51 and the second wall surface 52. In addition, when the separator 13 is passed from the first wall surface 51 to the second wall surface 52, the separator 13 is folded and pressed onto the stacking region 56 by one of the wall surfaces 51 and 52 and is also sandwiched between the other wall surface 51 or 52 and the third wall surface 53 or the fourth wall surface 54. Accordingly, when the separator 13 is transferred from the first wall surface 51 to the second wall surface 52, or when being transferred in the opposite direction, it is possible to fold the separator 13 onto the stacking region 56 precisely with a fixed tension and length without misalignment or loosening of the separator 13.

At the tension roller 132 that applies tension to the separator 13, it is sufficient to make adjustments so as to apply the minimum necessary tension to prevent loosening on reaching the first wall surface 51 and the second wall surface 52 to the separator 13. Accordingly, it is possible to set the tension of the separator 13 comparatively low and possible to prevent problems, such as the separator 13 snapping or contracting after folding. It is also possible to prevent problems such as creases being produced and warping during folding due to the tension of the separator 13 being too weak.

In particular, the first wall surface 51 and the second wall surface 52 have the same length L1 as the stacking region 56 onto which the separator 13 is folded and have the same width or are wider. Accordingly, the first wall surface 51 and the second wall surface 52 hold the separator 13 by vacuum with the same size and area as the folded parts should have, and to prevent problems, such as creases being produced and warping of the separator 13 during folding. The third wall surface 53 is provided on the front end 51b of the first wall surface 51, the fourth wall surface 54 is provided on the front end 52b of the second wall surface 52, the folded-back part of the separator 13 is guided by the third wall surface 53 and the fourth wall surface 54 and is precisely suction-caught by the other wall surface 51 or 52. The separator 13 is precisely foldedback, that is the position and size of folded end portion of the separator 13 is precisely fixed. This means that by using the stacking apparatus 1, it is possible to manufacture a high quality stacked structure (electrode stack) 10.

The stacking stage 55 has suction holes (not shown) that hold the separator 13 that is to be folded first by vacuum. Once the separator 13 has been folded on the stacking stage 55 while being sandwiched between the anode sheets 11 and the cathode sheets 12, the stacking stage 55 is gradually lowered with respect to the support table 79 that rotatably supports the wings 71 and 72 using a stepping motor that operates as the position adjusting unit 59. Accordingly, the position of the stacking region 56 where the separator 13 is folded by the first wall surface 51 and the second wall surface 52 is controlled so as to always be fixed at the upper surface of the support table 79. This means that the angle at which the separator 13 is folded by the first wall surface 51 and the second wall surface 52 and the force with which the separator 13 is pressed (pressurized) onto the layered stack 10 by the first wall surface 51 and the second wall surface 52 are kept constant. The position adjusting unit 59 may control the position of the support table 79 instead of the position of the stacking stage 55 or both of such positions may be controlled.

Figure 5:
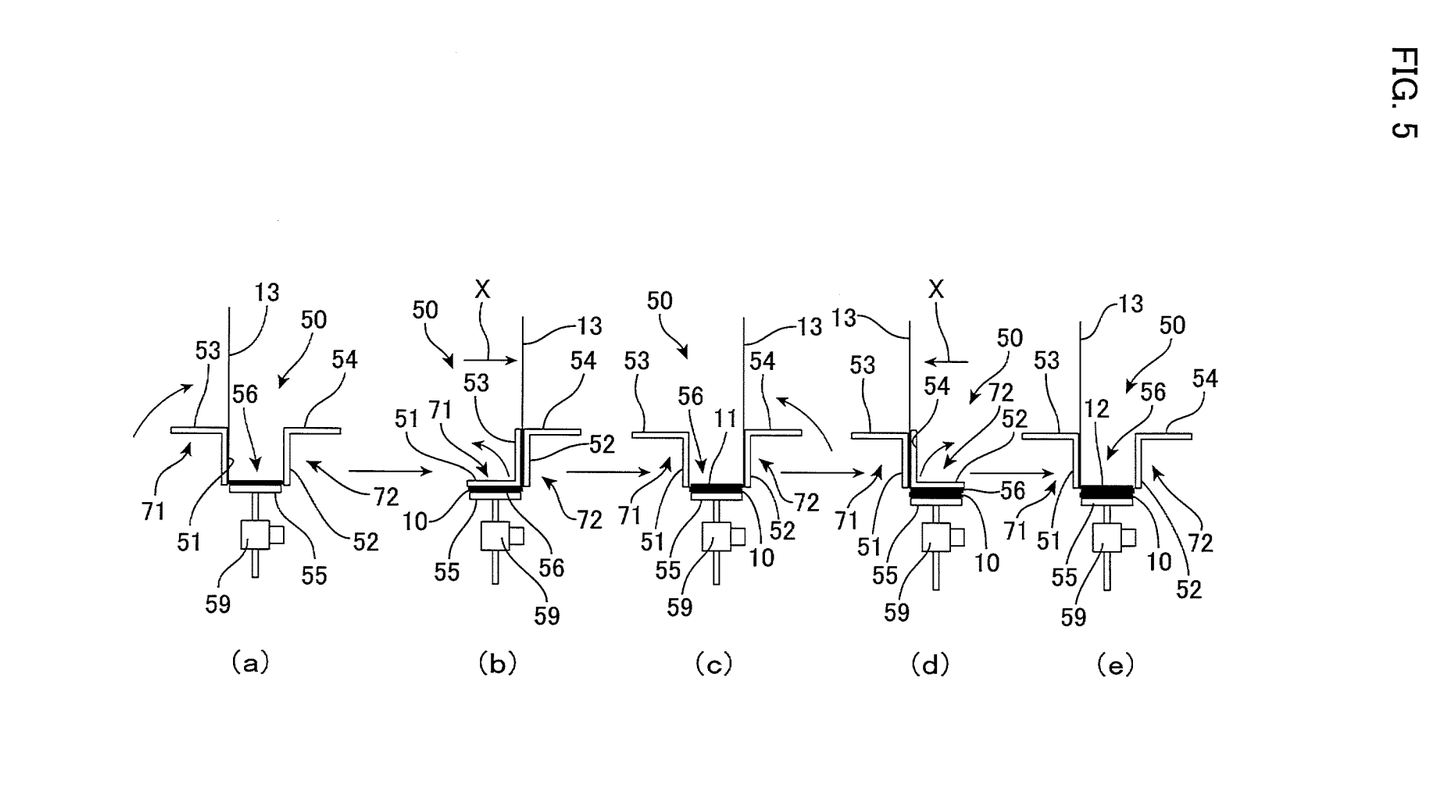

FIG. 5 shows the procedure by which the layered stack (stacked electrode) 10 is manufactured by the stacking unit 50. In FIG. 5(a), the first wing 71 rotates in the clockwise direction to become lowered onto the stacking region 56 in a state where the continuous sheet (separator) of the separator 13 is held by suction (vacuum) on the first wall surface 51. In FIG. 5(b), the separator 13 is folded over and placed on the stacking region 56 by the first wall surface 51. Together with this, the separator 13 is guided by the third wall surface 53 so as to face the second wall surface 52 so that the separator 13 becomes held by vacuum by the second wall surface 52.

After this, in FIG. 5(c), the first wing 71 rotates (reverses) in the counter clockwise direction in a state where the first wing 71 has released the separator 13 so that the first wall surface 51 becomes erected from the stacking region 56 in a direction that is substantially perpendicular. Together with this, an anode sheet 11 is conveyed into the stacking region 56 by the first conveying unit 61 and the anode sheet 11 is stacked on the separator 13 that has been folded. After this, the second wing 72 is rotated (lowered) in the counter clockwise direction in a state where the separator 13 is held by suction on the second wall surface 52.

In FIG. 5(d), the separator 13 is folded on the stacking region 56 by the second wall surface 52. Together with this, the separator 13 is guided by the fourth wall surface 54 so as to face the first wall surface 51 so that the separator 13 caught by suction by the first wall surface 51. After this, in FIG. 5(e), the second wing 72 rotates (reverses) in the clockwise direction in a state where the separator 13 has been released and the second wall surface 52 is erected from the stacking region 56.

Together with this, a cathode sheet 12 is conveyed into the stacking region 56 by the second conveying unit 62 and the cathode sheet 12 is stacked on the separator 13 that has been folded. After this, the procedure returns to FIG. 5(*a*) and the processes described above are repeated until a predetermined number of anode sheets 11 and cathode sheets 12 are stacked with separators 13 in between.

While doing so, the position of the stacking stage 55 is lowered or retracted by the position adjusting unit 59 corresponding to the thickness of the separator 13, the anode sheets 11, and the cathode sheets 12 that have been piled up. Also, by moving the supply roller 136 of the third conveying unit 135 in the X direction along the slider 137, the supply position of the separator 13 moves forward and backward in the X direction so as to reach positions that substantially follow the first wall surface 51 and the second wall surface 52.

Figure 6:
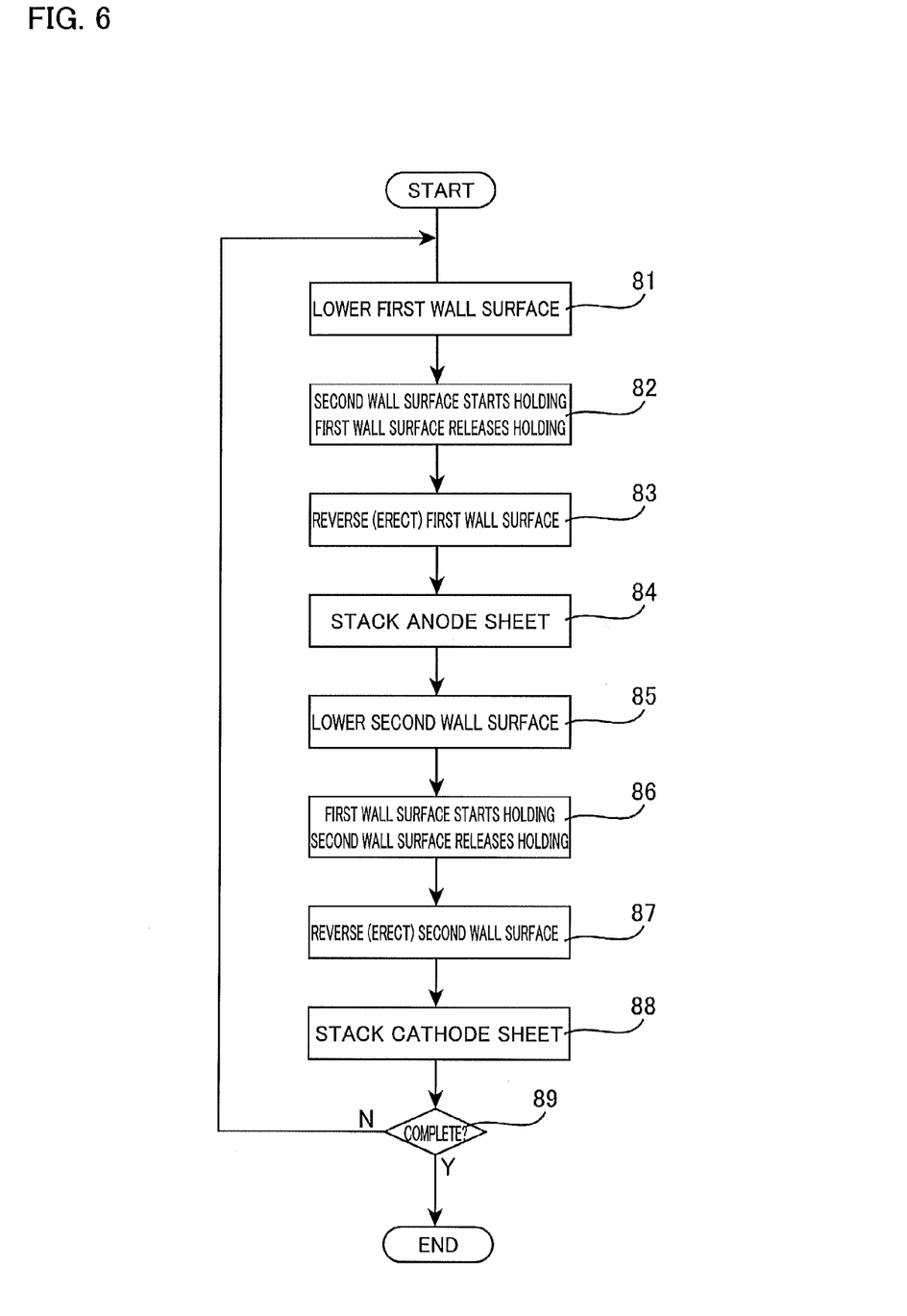
FIG. 6 is a flowchart showing the procedure for manufacturing a cell using the stacking unit.

FIG. 6 shows a procedure of manufacturing the layered stack (electrode stack, cell) 10 for a battery by the stacking apparatus 1 controlled with the control unit 100. The control unit 100 is a controller equipped with computer resources such as a CPU and memory and controls the stacking apparatus 1 using a program (program product).

First, in step 81, the motor 75 is controlled and the first wall surface 51 is lowered in a state where the continuous separator 13 is held by suction to fold over the separator 13 onto the stacking region 56. In step 82, the second wall surface 52 starts holding of separator and then the first wall surface 51 releases the separator. By doing so, holding of the separator 13 is passed from the first wall surface 51 to the second wall surface 52. In step 83, the first wall surface 51 is reversed and the first wall surface 51 is erected in a state where the separator 13 has been released. In step 84, an anode sheet 11 is conveyed into the stacking region 56 by the first conveying unit 61 and stacked on the separator 13.

In step 85, the motor 76 is controlled and the second wall surface 52 is lowered in a state where the continuous separator 13 is held to fold the separator 13 onto the stacking region 56. In step 86, the first wall surface 51 starts holding the separator and the second wall surface 52 releases the separator. By doing so, the holding of the separator 13 is passed from the second wall surface 52 to the first wall surface 51. In step 87, the second wall surface 52 is reversed and the second wall surface 52 is erected in a state where the separator 13 has been released. In step 88, a cathode sheet 12 is conveyed into the stacking region 56 by the second conveying unit 62 and stacked on the separator 13.

In step 89, steps 81 to 88 are repeated until the folding (stacking) process has been completed a predetermined number of times. By carrying out the above processes, cells 10 are successively manufactured by the stacking apparatus 1 using the continuous separator 13.

Note that although an example where a stacked electrode (cell) 10 for a lithium ion cell is manufactured by the stacking apparatus 1 has been described above, the present invention is not limited to a lithium ion battery and the stacking apparatus 1 is favorable for manufacturing a battery including a stacked type electrode.

The invention claimed is:

1. An apparatus that manufactures a stacked electrode where anode sheets and cathode sheets are stacked with a separator in between, comprising:
    a first unit that folds a continuous separator onto a first region; and
    a second unit that alternately supplies an anode sheet and a cathode sheet to the first region in synchronization with folding of the continuous separator by the first unit,
    wherein the first unit includes a first wall surface and a second wall surface disposed on both sides of the first region whose lengths are substantially equal to a folded length and are alternately lowered onto and reversed from the first region to fold over the continuous separator onto the first region in a state where the continuous separator is held by suction alternately on the first wall surface and the second wall surface.

2. The apparatus according to claim 1,
    wherein the first wall surface and the second wall are alternately lowered onto and erected from the first region.

3. The apparatus according to claim 1,
    wherein the first unit includes:
    a first subunit that takes hold of the continuous separator on the first wall surface when the second wall surface has been lowered, lowers the first wall surface to the first region in a state where the continuous separator is held by suction, and reverses the first wall surface in a state where the continuous separator has been released; and
    a second subunit that takes hold of the continuous separator on the second wall surface when the first wall surface has been lowered, lowers the second wall surface to the first region in a state where the continuous separator is held by suction, and reverses the second wall surface in a state where the continuous separator has been released.

4. The apparatus according to claim 1,
    wherein the first wall surface includes a leading end that guides the continuous separator to a base end of the second wall surface when the first wall surface has been lowered, and
    the second wall surface includes a leading end that guides the continuous separator to a base end of the first wall surface when the second wall surface has been lowered.

5. The apparatus according to claim 1,
    wherein the first unit further includes a third wall surface that presses the continuous separator onto the second wall surface when the first wall surface has been lowered, and a fourth wall surface that presses the continuous separator onto the first wall surface when the second wall surface has been lowered.

6. The apparatus according to claim 1,
    further comprising a position adjusting unit that retracts a layered stack stacked on the first region with respect to first wall surface and the second wall surface.

7. The apparatus according to claim 1,
    further comprising a supplying unit that supplies the continuous separator to the first wall surface and the second wall surface in a state where the continuous separator is under tension.

8. A method comprising manufacturing a stacked electrode where anode sheets and cathode sheets are stacked with a separator in between,
    wherein manufacturing the electrode structure includes:
    folding a continuous film of separator onto a first region by placing a first wall surface and a second wall surface, whose lengths are substantially equal to a folded length, on the first region in a state where the continuous separator is alternately held by suction, and
    stacking an anode sheet and a cathode sheet by alternately supplying the anode sheet and the cathode sheet to the first region in synchronization with the folding the continuous separator.

9. The method according to claim 8,
    wherein the folding includes alternately lowering and reversing the first wall surface and the second wall surface, which are disposed on both sides of the first region, onto and from the first region to fold the continuous separator supplied to the first region from above onto the first region.

10. The method according to claim 9, wherein the folding includes lowering the first wall surface onto the first region in a state where the continuous separator is held by suction and reversing the first wall surface in a state where the continuous separator has been released, and the second wall surface taking hold of the continuous separator when the first wall surface has been lowered.

11. A control method of an apparatus including a first unit that alternately lowers a first wall surface and a second wall surface whose lengths are substantially equal to a folded length onto a first region to fold a continuous separator onto the first region, and a second unit that alternately supplies an anode sheet and a cathode sheet to the first region in synchronization with folding of the continuous separator, the control method comprising:
lowering the first wall surface onto the first region in a state where the continuous separator is held by suction and erecting the first wall surface in a state where the continuous separator has been released; and
lowering the second wall surface onto the first region in a state where the continuous separator is held by suction when the first wall has been erected and erecting the second wall surface in a state where the continuous separator has been released.

* * * * *